(12) United States Patent
Brois

(10) Patent No.: US 6,462,140 B2
(45) Date of Patent: Oct. 8, 2002

(54) CARBONYL CONTAINING COMPOUNDS

(75) Inventor: Stanley J. Brois, Westfield, NJ (US)

(73) Assignee: Exxon Research & Engineering Co.

(*) Notice: Subject to any disclaimer, the term of this patent is extended or adjusted under 35 U.S.C. 154(b) by 0 days.

(21) Appl. No.: 09/781,004

(22) Filed: Feb. 9, 2001

(65) Prior Publication Data

US 2001/0007893 A1 Jul. 12, 2001

Related U.S. Application Data

(60) Division of application No. 09/476,924, filed on Jan. 4, 2000, now abandoned, which is a division of application No. 09/233,011, filed on Jan. 19, 1999, now Pat. No. 6,077,915, which is a continuation of application No. 07/935,604, filed on Aug. 26, 1992, now abandoned, which is a continuation-in-part of application No. 07/556,244, filed on Jul. 23, 1990, now abandoned.

(51) Int. Cl.$^7$ .................................................. C08F 8/00
(52) U.S. Cl. ....................... 525/331.7; 525/332.1; 525/332.8; 525/332.9; 525/333.1; 525/333.7; 525/383; 525/385; 525/386
(58) Field of Search .................... 525/331.7, 332.1, 525/332.8, 332.9, 333.1, 333.7

(56) References Cited

U.S. PATENT DOCUMENTS

| | | | | |
|---|---|---|---|---|
| 3,609,111 A | * | 9/1971 | Kumanotani | 525/301 |
| 3,952,023 A | * | 4/1976 | Kaiya et al. | 525/383 |
| 4,566,984 A | | 1/1986 | Bush | 252/140 |
| 5,030,715 A | * | 7/1991 | Agouridas et al. | 530/331 |
| 5,260,424 A | * | 11/1993 | Cohen et al. | 525/386 |
| 5,783,626 A | * | 7/1998 | Taylor et al. | 524/329.9 |

OTHER PUBLICATIONS

Mechanism Of The Dimethyl Mesoxalate–Alkene Enc. Reaction. Deuterium Kinetic Isotope Effects. Achmatowicz, et al., American Chemical Society, Apr. 1, 1980.

"Thermal Reactions of Donor–Acceptor Systems . . . ", Mattay et al., *Heterocycles*, 27(9), 2156–65, 1988.

Enecarboxylation with Diethyl Oxomalonate as an Enophilic Equivalent of Carbon Dioxide. A Synthesis of Allylcarboxylic Acids, Solomon, et la., American Chemical Society, 106, 3797–3802, 1984.

Mechanism of the Dimethyl Mesoxalate–Alkene Ene Reaction. Deuterium Kinetic Isotope Effects, Achmatowicz, et al., American Chemical Society, Apr. 1, 1980.

CA 1984:422719 "Selectivity and Catalysis in Ene Reactions of Diethyl Oxomalonate", Salomon et al, J. Org. Chem., 49(13, 2446–54, 1984.*

* cited by examiner

*Primary Examiner*—Bernard Lipman

(57) ABSTRACT

In accordance with the present invention, there is provided a novel composition of matter having the formula:

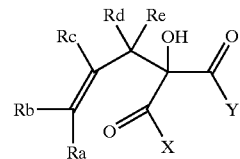

wherein $R_a$, $R_b$, $R_c$, $R_d$ and $R_e$ are independently selected from the group consisting of H, alkyl groups and substituted alkyl groups having about 1 to $10^6$ carbon atoms, alkenyl groups and substituted alkenyl groups having about 3 to $10^6$ carbon atoms, wherein the substituents on the alkyl and/or alkenyl groups are selected from the group consisting of alkoxy, halogen, CN, OH, $HO(CH_2CH_2O)_x$ (X=1–10), acyl, acyloxy and aryl substituents.

2 Claims, No Drawings

CARBONYL CONTAINING COMPOUNDS

This is a divisional, of application Ser. No. 09/476,924, filed Jan. 4, 2000, abandoned, which is a division of Ser. No. 09/233,011, filed Jan. 19, 1999, now U.S. Pat. No. 6,077,915, which is a continuation of Ser. No. 07/935,604, filed Aug. 26, 1992 abandoned, which is a CIP of Ser. No. 07/556,244, filed Jul. 23, 1990, abandoned.

FIELD OF THE INVENTION

The present invention relates to novel compounds formed from acyclic carbonyl compounds and unsaturated hydrocarbons.

BACKGROUND OF THE INVENTION

Various unsaturated hydrocarbon polymers have been reacted with maleic anhydrides to form a variety of maleic anhydride adducts of unsaturated hydrocarbon polymers. The reactivity of maleic anhydride with many unsaturated hydrocarbon polymers is poor and in some instances, as for example with EPDM rubber, even employment of extensive heating is ineffective. Free employment of extensive heating is ineffective. Free radical reactions which graft maleic anhydride onto the unsaturated hydrocarbon polymer have been utilized as alternative routes. Free radical grafting leads to chain scission, crosslinking and solvent grafting if the solvent is sufficiently reactive. The reaction of acyclic carbonyl monomers with the unsaturated hydrocarbon polymer overcomes these aforementioned deficiencies in that the acyclic carbonyl monomers can be reacted with the unsaturated hydrocarbon polymer at moderate temperatures in either the bulk or solution state without the employment of free radical initiators to form novel polymers which are useful as solution viscosifiers.

SUMMARY OF THE INVENTION

In accordance with the present invention, there is provided a novel composition of matter having the formula:

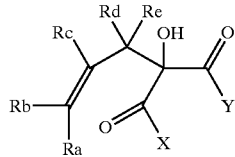

wherein $R_a$, $R_b$, $R_c$, $R_d$ and $R_e$ are independently selected from the group consisting of H, alkyl groups and substituted alkyl groups having about 1 to $10^6$ carbon atoms, alkenyl groups and substituted alkenyl groups having about 3 to $10^6$ carbon atoms, wherein the substituents on the alkyl and/or alkenyl groups are selected from the group consisting of alkoxy, halogen, CN, OH, $HO(CH_2CH_2O)_x$ (X=1–10), acyl, acyloxy and aryl substituents.

These novel compounds are formed by contacting a hydrocarbon having the formula:

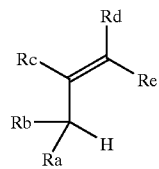

with an acyclic carbonyl having the formula:

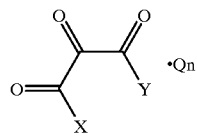

for a time and at a temperature sufficient to form the compounds, and in which $R_a$, $R_b$, $R_c$, $R_d$, $R_e$, X and Y are as described above and Q=HOH, MeOH, EtOH, or n-BuOH; n=0,1,>1; X or Y are selected from the group consisting of —OH; —OR$_1$; NR$_1$R$_2$; R$_1$; wherein R$_1$ has about 1 to about 18 carbon atoms,

wherein $R_2$ is hydrogen or any alkyl group of from about 1 to about 18 carbon atoms, —NR$_3$R$_4$ wherein R$_3$ and R$_4$ are alkyl groups of from about 1 to about 18 carbon atoms; OR$_5$ wherein R$_5$ is hydrogen or an alkyl group having about 1 to about 18 carbon atoms, —COOR$_6$ wherein R$_6$ is hydrogen or an alkyl group having about 1 to about 18 carbon atoms, —CN, and —SR$_7$ wherein R$_7$ is an alkyl group having about 1 to about 18 carbon atoms. Typical monomers are ketomalonic acid, esters of ketomalonic acid including alkyl and aryl esters; other useful keto-acids are alpha keto succinic acid, diketo succinic acid, and any alpha ketohydrocarboic acid and alpha, beta-diketohydrocarboic acids and their ester and amide analogs which have a molecular weight of about 130 to 500. Useful ketones include dimethyl, diphenyl and di-tolyl tri- and tetraketones.

The compounds of the present invention are useful as solution viscosification agents.

GENERAL DESCRIPTION

Compounds having the formula:

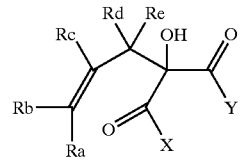

are prepared by contacting an olefinic compound and an acyclic carbonyl compound for a time and at a temperature sufficient to form the compound. Thus, a typical reaction to produce these novel carbonyl compounds is represented by the equation:

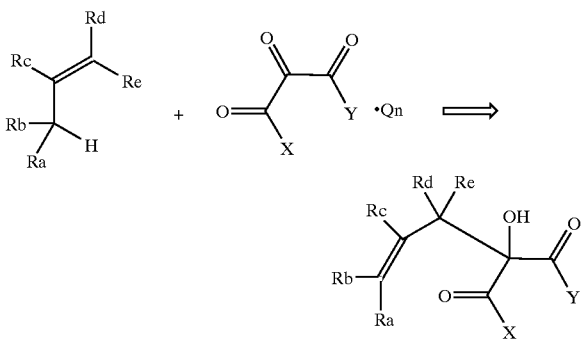

wherein $R_a$, $R_b$, $R_c$, $R_d$ and $R_e$ are independently selected from the group consisting of H, alkyl groups and substituted alkyl groups having about 1 to $10^6$ carbon atoms, alkenyl groups and substituted alkenyl groups having 3 to $10^6$ carbon atoms, wherein the substituents on the alkyl and/or alkenyl groups are selected from the group consisting of alkoxy, halogen, CN, OH, $HO(CH_2CH_2O)_x$ (X=1–10), acyl, acyloxy and aryl substituents. Q=HOH, MeOH, EtOH, or n-BuOH; n=0,1,>1; X or Y are selected from the group consisting of —OH; —$OR_1$; $NR_1R_2$; $R_1$; wherein $R_1$ has about 1 to about 18 carbon atoms,

wherein $R_2$ is hydrogen or any alkyl group of from about 1 to about 18 carbon atoms, —$NR_3R_4$ wherein $R_3$ and $R_4$ are alkyl groups of from about 1 to about 18 carbon atoms; $OR_5$ wherein $R_5$ is hydrogen or an alkyl group having 1 to about 18 carbon atoms, —$COOR_6$ wherein $R_6$ is hydrogen or an alkyl group having about 1 to about 18 carbon atoms, —CN, and —$SR_7$ wherein $R_7$ is an alkyl group having about 1 to about 18 carbon atoms. Typical monomers are ketomalonic acid, esters of ketomalonic acid including alkyl and aryl esters; other useful keto-acids are alpha keto succinic acid, diketo succinic acid, and any alpha ketohydrocarboic acid and alpha, beta-diketohydrocarboic acids and their ester and amide analogs which have a molecular weight of about 130 to 500. Useful ketones include dimethyl, diphenyl and di-tolyl tri- and tetraketones.

Especially preferred olefinic hydrocarbons are alkenes having from 8 to 30 carbon atoms and olefinic polymers containing an allylic hydrogen and having molecular weights ranging from about 500 to about 10,000,000. The olefinic hydrocarbons may, of course, be substituted with functionalities such as —CN, —OH, $HO(CH_2CH_2O)_x$ (x=1–10), alkoxy, halogen, and

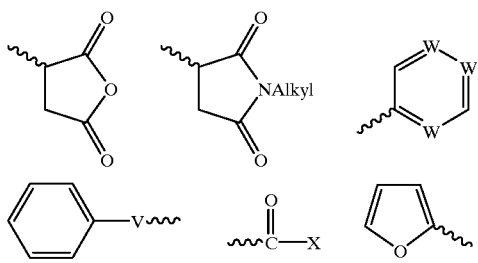

wherein W=C, N; V=O, S, $SO_2$; and X is selected from the group consisting of OH; —$OR_1$, $NR_1R_2$; $R_1$; wherein $R_1$ has about 1 to about 18 carbon atoms,

wherein $R_2$ is hydrogen or any alkyl and has about 1 to about 18 carbon atoms, —$NR_3R_4$ wherein $R_3$ and $R_4$ has about 1 to about 18 carbon atoms, $OR_5$ wherein $R_5$ is hydrogen or an alkyl group having about 1 to about 18 carbon atoms, —$COOR_6$ wherein $R_6$ is hydrogen or an alkyl group having about 1 to about 18 carbon atoms, —CN and —$SR_7$, wherein $R_7$ is an alkyl group having about 1 to about 18 carbon atoms. Typical substituted alkenes include oleic acid, oleyl alcohol, methyl oleate, 2-octadecenyl succinic anhydride, octadecenyl benzene, octadecenyl methyl ketone, octadecenyl phenyl sulfide, octadecenyl phenyl sulfone, octadecenyl chloride, octadecenyl phenol, chlorobutyl, polyisobutenyl succinic anhydride, and related functional olefins and polyolefins.

Among the preferred polymers are butyl rubber and EPDM polymers. The expression "butyl rubber" as employed in the specification and claims is intended to include copolymers made from a polymerization reaction mixture having therein from 70 to 99.5% by weight of an isobutylene and about 0.5 to 30% by weight of a conjugated multi-olefin having from about 4 to 14 carbon atoms, e.g., isoprene. The resulting copolymer contains 85 to 99.8% by weight of combined isoolefin and 0.2 to 15% of combined multiolefin.

Butyl rubber generally has a Staudinger molecular weight as measured by GPC of about 20,000 to about 500,000, preferably about 25,000 to about 400,000, especially about 100,000 to about 400,000 and a Wijs Iodine No. of about 0.5 to 50, preferably 1 to 15. The preparation of butyl rubber is described in U.S. Pat. No. 2,356,128, which is incorporated herein by reference.

For the purposes of this invention, the butyl rubber may have incorporated therein from about 0.2 to 10% of combined multiolefin; preferably about 0.5 to about 6%, more preferably about 1 to about 4%, e.g., 2%.

Illustrative of such a butyl rubber is Exxon butyl 365 (Exxon Chemical Company), having a mole percent unsaturation of about 2.0% and a Mooney viscosity (ML, 1+3, 212° F.) of about 40 to 50.

Low molecular weight butyl rubbers, i.e., butyl rubbers having a viscosity average molecular weight of about 5,000 to 85,000, and a mole percent unsaturation of about 1 to about 5%, may be sulfonated to produce the polymers useful in this invention. Preferably, these polymers have a viscosity average molecular weight of about 25,000 to about 60,000.

The EPDM terpolymers are low unsaturated polymers having about 0.5 to about 10.0 wt. % olefinic unsaturation, more preferably about 2 to about 8, most preferably about 3 to 7 defined accordingly to the definition as found in ASTM-1418–64 and is intended to mean terpolymers containing ethylene and propylene in the backbone and an olefin residue in the side chain as a result of multiolefin incorporation in the backbone. Illustrative methods for producing these terpolymers are found in U.S. Pat. No. 3,280,082, British Patent No. 1,030,289 and French Patent No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g., 50 wt. % and about 2.6 to about 8.0 wt. % diene monomer, e.g., 5.0 wt. %. The diene monomer is preferably a nonconjugated diene.

Illustrative of these nonconjugated diene monomers which may be used in the terpolymer (EPOM) are 1,4-hexadiene, dicyclopentadiene, 4-ethylidene-2-norbornene, 5-methylene-2-norbornene, 5-propenyl-norbornene, methyl tetrahydroindene and 4-methyl-methylene-2-norbornene.

A typical EPDM is Vistalon 2504 (sold by Exxon Chemical Company, Houston, Tex.), a terpolymer having a Mooney viscosity (ML, 1+8, 212° F.) of about 40 and having an ethylene content of about 50 wt. % and a 5-ethylidene-2-norbornene content of about 5.0 wt. %. The $M_n$ as measured by GPC of Vistalon 2504 is about 47,000, the $M_v$ as measured by GPC is about 145,000 and the $M_w$ as measured by GPC is about 174,000.

Another EPDM terpolymer Vistalon 2504–20 is derived from Vistalon 2504 (also sold by Exxon Chemical Company) by a controlled extrusion process, wherein the resultant Mooney viscosity at 212° F. is about 20. The $M_n$ as measured by GPC of Vistalon 2504–20 is about 26,000, the $M_v$ as measured by GPC is about 90,000 and the $M_w$ as measured by GPC is about 125,000.

Nordel 1320 (sold by Dupont, Wilmington, Del.) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($M_n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $M_v$ as measured by GPC of the EPDM terpolymer is preferably below about 350,000 and more preferably below about 300,000. The $M_w$ as measured by GPC of the EPDM terpolymer is preferably below about 500,000 and more preferably below about 350,000.

Other suitable olefin polymers having $M_n$ of about 500 to $10^6$ include polymers comprising a major molar amount of $C_2$ to $C_5$ monoolefins, e.g., ethylene, propylene, butylene, isobutylene and pentene. The polymers may be homopolymers such as polyisobutylene, as well as copolymers of two or more such olefins such as copolymers of ethylene and propylene, butylene and isobutylene, propylene and isobutylene and the like.

The reaction of the acyclic carbonyl compound with the olefinic containing compound can occur in solution, in a melt and in polymer processing equipment such as a rubber mill, a Brabender, an extrude or a Banbury mixer.

Ene adductions can also be effected with acid catalysts such as kaolin, montmorillonite, silicates, $SnCl_4$, $FeCl_3$, and $BF_3$, which facilitate adduct formation. Moreover, the acid catalysts can produce lactones, secondary ene adducts and cyclic ethers, the product ratios varying with reaction conditions, and catalyst and reactant types.

The time and temperature for contacting can be varied widely and will depend, in part, on whether a catalyst is present. In general, the acyclic carbonyl compound is contacted with the olefinic containing compound in solution at temperatures ranging from about 50° C. to about 220° C. for times ranging from about 4 to about 40 hours.

Typically, the olefinic compound is dissolved in a suitable solvent, such as tetrahydrofuran, xylene or mineral oil and heated to temperatures ranging from about 50° C. to about 220° C. The carbonyl compound, as a hydrate or hemiketal of methanol, butanol, or a suitable alcohol, is dissolved in a suitable solvent such as tetrahydrofuran, dioxane, or butanol, and added to the heated olefin solution. The reaction mixture is heated, with stirring, until infrared and NMR analysis of the mixture indicates that the ene-addition of the carbonyl monomer to the unsaturated polymer is complete. Depending on temperature and concentration, reaction periods of about 4 to 40 hours are sufficient to achieve high conversions to mono- and/or multiple ene adducts.

Optionally, bulk reactions can be carried out at about 80° C. to about 200° C. for approximately 3 to 300 minutes, depending upon the polyolefin used, the carbonyl compound reactivity, and use of a catalyst.

If necessary, products can be isolated by solvent removal by evaporation, or by adding the reaction mixture to a polar solvent such as acetone, which induces the precipitation of the functionalized polymer.

DESCRIPTION OF THE PREFERRED EMBODIMENTS

The following examples illustrate the present invention without, however, limiting the same hereto.

Example 1

A mixture of diethyl ketomalonate (6.12 g) and 1-octadecene (8.84 g) was combined in a reaction flask magnetically stirred and heated to 160–170° C. for 3 hours. The temperature was raised to 200° C. and kept at 200° C. for 30 hours. Upon cooling, the reaction mixture solidified. The solids, recrystallized from diethyl ether, showed a mass spectrum with a molecular ion (426) and an infrared spectrum with a strong hydroxyl absorption band at 3 microns, and a very strong ester carbonyl band at 5.82 microns. The CMR spectrum of the ene-adduct featured olefinic and ester carbon signals consistent with the proposed structure (A):

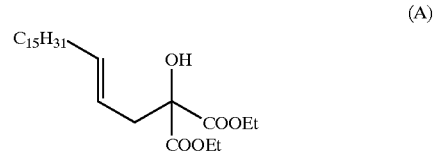

(A)

Example 2

One hundred grams of polyisobutylene, MW 950, and 34.0 grams of diethyl ketomalonate were combined in a reaction flask, stirred magnetically, and heated at 200° C. for about 40 hours. Rotoevaporation of the reaction mixture at about 100° C. for 8 hours afforded a residue which featured (a) an infrared spectrum with a strong ester carbonyl absorption band at 5.85 microns, and (b) a saponification number of 92.

Example 3

One hundred grams of polyisobutylene succinic anhydride (MW⁻1050) having a saponification number of 55 were combined with 17 grams of diethyl ketomalonate, and heated to about 200° C. for 48 hours.

Rotoevaporation of the reaction mixture at about 100° C. for 8 hours gave a residue which featured an infrared spectrum having anhydride and ester carbonyl absorption bands at 5.65 and 5.85 microns, respectively.

Example 4

A mixture of 95 grams of polyisobutylene (MW⁻950), 10 grams of maleic anhydride, and 17.4 grams of diethyl ketomalonate was heated at about 210° C. for 40 hours. The cooled reaction mixture was dissolved in 500 ml of cyclohexane, filtered and rotoevaporated at about 100° C. for 8 hours. The residue featured an infrared spectrum with strong anhydride, and ester carbonyl absorption bands at 5.65 and 5.85 microns, respectively.

Example 5

Ten grams of Vistalon-7504, an ethylidene norbornene (ENB) terpolymer containing about 52% ethylene, 43% propylene and 5% ENB, and having a Mn⁻55,000, were dissolved in 100 ml of xylene containing 4 grams of diethyl ketomalonate. The mixture was heated to about 135° C. and maintained at 135° C. for about 30 hours under a blanket of nitrogen. Addition of the cooled reaction mixture to one liter of acetone caused the functionalized polymer to precipitate from solution. The dried polymer analyzed for 5.04% oxygen, and featured an infrared spectrum (film) with an intense ester carbonyl band at 5.82 microns, consistent with ene adducts including structure (B) shown below:

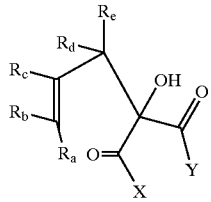

(B)

What is claimed is:

1. A composition having the formula:

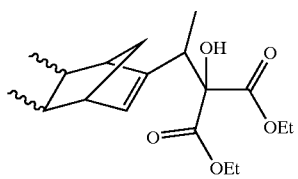

wherein $R_a$, $R_b$, $R_c$, $R_d$, and $R_e$ are independently selected from the group consisting of H and alkyl groups and substituted alkyl groups having 1 to $10^6$ carbon atoms, alkenyl groups and substituted alkenyl groups having about 3 to $10^6$ carbon atoms, wherein the substituents on the alkyl and/or alkenyl groups are selected from the group consisting of alkoxy, halogen, CN, OH, $HO(CH_2CH_2O)_x(X=1-10)$, acyl, acyloxy, and aryl substituents; and X and Y are independently selected from the group consisting of: —OH, —$OR_1$, $NR_1R_2$, —$R_1$ and phenyl; wherein $R_1$ is an alkyl group having about 1 to about 18 carbon atoms, and $R_2$ is hydrogen, or an alkyl group of from about 1 to 18 carbon atoms, with the proviso that the moiety:

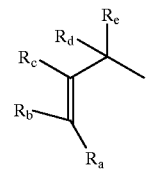

comprises an olefinic polymer having a molecular weight of from about 500 to 10,000,000.

2. A composition having the formula:

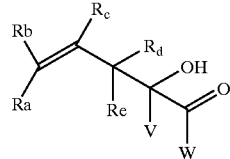

wherein $R_a$, $R_b$, $R_c$, $R_d$, and $R_e$ are independently selected from the group consisting of:

hydrogen, alkyl groups and substituted alkyl groups, having 1 to $10^6$ carbon atoms and alkenyl groups and substituted alkenyl groups having about 3 to $10^6$ carbon atoms, wherein the substituents on the alkyl and/or alkenyl groups are selected from the group consisting of alkoxy, halogen, CN, OH, $HO(CH_2CH_2O)_x$ (X=1–10), acyl, acyloxy, and aryl substituents; V is selected from the group consisting of —$R_2$, —$CH_2COOH$, —$CH_2COOR_1$, —$C(=O)COOH$, —$C(=O)COOR_1$, and $C(=O)R_2$; wherein $R_1$ is an alkyl having about 1 to 18 carbon atoms, and $R_2$ is a hydrogen or an alkyl group having about 1 to 18 carbon atoms, with the proviso that the moiety:

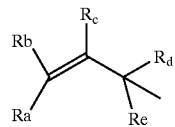

comprises an olefinic polymer having a molecular weight of from about 500 to 10,000,000.

* * * * *